United States Patent [19]

Taniguchi et al.

[11] Patent Number: 5,288,562
[45] Date of Patent: Feb. 22, 1994

[54] SOLID ELECTROLYTE FUEL CELL

[75] Inventors: Noboru Taniguchi; Junji Niikura; Kazuhito Hatoh; Takaharu Gamo, all of Osaka, Japan

[73] Assignee: Matsushita Electric Industrial Co., Ltd., Kadoma, Japan

[21] Appl. No.: 820,509

[22] Filed: Jan. 14, 1992

[30] Foreign Application Priority Data

Jan. 18, 1991 [JP] Japan ............................ 3-004273

[51] Int. Cl.⁵ ........................................ H01M 8/10
[52] U.S. Cl. ........................................ 429/32; 429/34; 429/39
[58] Field of Search .......................... 429/34, 39, 32

[56] References Cited

U.S. PATENT DOCUMENTS

| | | |
|---|---|---|
| 3,300,344 | 1/1967 | Bray et al. . |
| 4,758,481 | 7/1988 | Fauvel .................. 429/39 |
| 4,818,639 | 4/1989 | Kunz ..................... 429/34 |
| 4,943,495 | 7/1990 | Okada et al. ......... 429/34 X |
| 5,034,288 | 7/1991 | Bossel . |

FOREIGN PATENT DOCUMENTS

| | | |
|---|---|---|
| 0357025 | 8/1989 | European Pat. Off. . |
| 0338823 | 10/1989 | European Pat. Off. . |
| 92/007931 | 5/1992 | European Pat. Off. . |
| 3918115 | 6/1989 | Fed. Rep. of Germany . |
| 4016157 | 5/1990 | Fed. Rep. of Germany . |
| 0425939 | 10/1990 | Fed. Rep. of Germany . |
| 63-86367 | 4/1988 | Japan . |
| 1167956 | 3/1989 | Japan . |
| 1-197972 | 8/1989 | Japan . |

*Primary Examiner*—John S. Maples
*Attorney, Agent, or Firm*—Ratner & Prestia

[57] ABSTRACT

A solid electrolyte fuel cell having a multi-layer structure of flat unit cells composed of a solid electrolyte, a first electrode and a second electrode with metal bipolar plates as gas barriers and collectors preferably made of foam metal or a foam alloy interposed between the adjacent unit cells. A fuel gas and an oxidizing gas are supplied to the fuel cell so that they flow in the directions crossing each other with the solid electrolyte interposed therebetween. The metal bipolar plate is preferably provided with grooves so that the fuel gas and the oxidizing gas can be uniformly distributed over the plate.

7 Claims, 4 Drawing Sheets

SOLID ELECTROLYTE FUEL CELL

BACKGROUND OF THE INVENTION

1. Field of the Invention

The present invention relates generally to a solid electrolyte fuel cell, and more particularly, to a solid electrolyte fuel cell in which a plurality of flat unit cells are vertically stacked.

2. Description of the Prior Art

Unlike other types of fuel cells, the solid electrolyte fuel cell is free of leakage and does not require refills so that it is expected to be maintenance-free. The solid electrolyte fuel cell is classified, according to the electrolyte property, into the low-temperature type which is operated at a temperature not exceeding 200° C. and the high-temperature type which is operated at a temperature of about 1000° C. The high-temperature type fuel cell can serve as an energy converter with high energy conversion efficiency, and is expected to be applied to a cogeneration system since the quality waste heat thereof can be utilized. Furthermore, this type of fuel cell does not require a catalyst and is versatile in the use of compatible fuel gas.

In order to obtain a large capacity of electricity, the fuel cells are layered or stacked to form a multilayer structure. The high-temperature type fuel cell is generally made of an oxide (a ceramic) which withstands a high temperature of about 1000° C. at which the cell is operated. When such fuel cells are stacked, the material for stacking must also be made of oxides, thereby restricting a method applicable for stacking the fuel cells. At present, under this restriction, there have been developed or proposed solid electrolyte fuel cells of several shapes and structures and methods for stacking such fuel cells in consideration of the producibility and processability of the oxides used.

Conventionally, the shape of the fuel cell is roughly classified into the cylindrical type and the flat type. Methods for stacking the cylindrical fuel cells such as a bundling method (by Westinghouse) have been developed. Further, a new "monolithic" fuel cell has been proposed, and a method for stacking this type of fuel cells has been studied.

As for materials for the components of the fuel cell, YSZ (yttria stabilized zirconia) is conventionally used for the solid electrolyte, an La-Co, La-Cr or La-Mn group oxide for an air electrode, and a cermet which is a mixture of a ceramic (zirconia) and metal (Ni) for a fuel electrode.

However, the conventional cylindrical solid electrolyte fuel cells, which are basically made of oxides and manufactured depending on the producibility and the processability of oxides used as mentioned above, have limitations in performance and reliability. On the other hand, the flat unit cell is not necessarily made of only oxides, and therefore can achieve performance superior to the cylindrical fuel cell. The monolithic fuel cell is not adequate in the electricity generating efficiency as in the case of the cylindrical fuel cell. Further, since the manufacture of the monolithic fuel cell is complicated by having many different processes, improvement is required for the practical use thereof.

A high electricity generating efficiency is expected from the flat unit cell, and a high output can be produced by forming a large-size flat unit cell. However, stacking the flat unit cells is difficult because there arises problems to overcome such as inter-connection of the fuel cell, separation of a fuel gas and an oxidizing gas, and sealing of each component, in addition to the problems relating to the oxides used, such as processability and reliability of oxide materials and performance of the oxide electrodes and conductors.

Further, a large-size flat unit cell is not effective in gas distribution. Referring to FIG. 6, the gas distribution in a conventional flat unit cell will be described. The fuel cell comprises a solid electrolyte 61, and an air electrode 62 and a fuel electrode 63 disposed on the opposite surfaces of the solid electrolyte 61. Platinum leads 67 are connected to the air electrode 62 and the fuel electrode 63, respectively. The fuel cell composed of the solid electrolyte 61, the air electrode 62 and the fuel electrode 63 is supported by a porous support plate 68, and a cylindrical cell housing 65 covers the entire structure. A fuel gas and an oxidizing gas are supplied to and discharged from the fuel cell. In the large-size flat unit cell having such a gas distribution system, in which each gas is supplied from only one side, the gas densities at the inlet and the outlets of each gas are different, resulting in non-uniform and insufficient gas distribution.

The objective of this invention is to provide a solid electrolyte fuel cell formed by vertically stacking flat unit cells, which is highly gastight and has an effective gas flow so as to allow a uniform gas diffusion to every corner, and can generate a large capacity of electricity efficiently and stably with an improved reliability.

SUMMARY OF THE INVENTION

The solid electrolyte fuel cell of this invention, which overcomes the above-discussed and numerous other disadvantages and deficiencies of the prior art, comprises a plurality of flat unit cells stacked with metal bipolar plates as gas barriers interposed between the adjacent unit cells, wherein each unit cell includes a first electrode, a second electrode, and a solid electrolyte disposed between the first electrode and the second electrode, the first electrode being supplied with a fuel gas and the second electrode being supplied with an oxidizing gas so as to generate electricity.

In a preferred embodiment, the metal bipolar plate is a polygon having 4(n+1) sides (wherein n denotes a natural number starting from 1).

In a preferred embodiment, the polygon is a regular polygon.

In a preferred embodiment, the polygon is an octagon.

In a preferred embodiment, the metal bipolar plate has ribs so as to facilitate uniform diffusion of the fuel gas and the oxidizing gas on the surfaces of the plate.

Alternatively, the solid electrolyte fuel cell of this invention comprises a plurality of flat unit cells stacked with collectors interposed between the adjacent unit cells, wherein each unit cell includes a first electrode, a second electrode, and a solid electrolyte disposed between the first electrode and the second electrode, the first electrode being supplied with a fuel gas and the second electrode being supplied with an oxidizing gas so as to generate electricity, and wherein the collectors are made of foam metal or a foam alloy.

In a preferred embodiment, the collectors are made of foam metal or a foam alloy containing nickel.

Alternatively, the solid electrolyte fuel cell of this invention comprises a plurality of flat unit cells stacked, wherein each unit cell includes a first electrode, a second electrode, and a solid electrolyte disposed between the first electrode and the second electrode, the first electrode being supplied with a fuel gas and the second electrode being supplied with an oxidizing gas so as to generate electricity, and wherein the fuel gas and the oxidizing gas flow crossing each other with the solid electrolyte interposed therebetween.

In a preferred embodiment, the direction in which the fuel gas is introduced and the direction in which the oxidizing gas is discharged are different.

In a preferred embodiment, the fuel gas is introduced from opposite inlets so that the fuel gas is discharged in the directions perpendicular to the directions in which the fuel gas is introduced.

In a preferred embodiment, the oxidizing gas is introduced from opposite inlets so that the oxidizing gas is discharged in the directions perpendicular to the directions in which the oxidizing gas is introduced.

Thus, the solid electrolyte fuel cell of this invention has a multilayer structure of the flat unit cells, the metal bipolar plates used as gas barriers and the collectors. All of the components of the fuel cell except for the electrolyte and the sealing agent are made of metal, thereby allowing a large capacity of electricity to be generated efficiently and stably with an improved reliability. Further, by using the metal bipolar plate provided with the ribs and the grooves, a high gastightness can be maintained and an effective gas flow can be achieved, thus allowing a uniform gas diffusion to every corner.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1A:
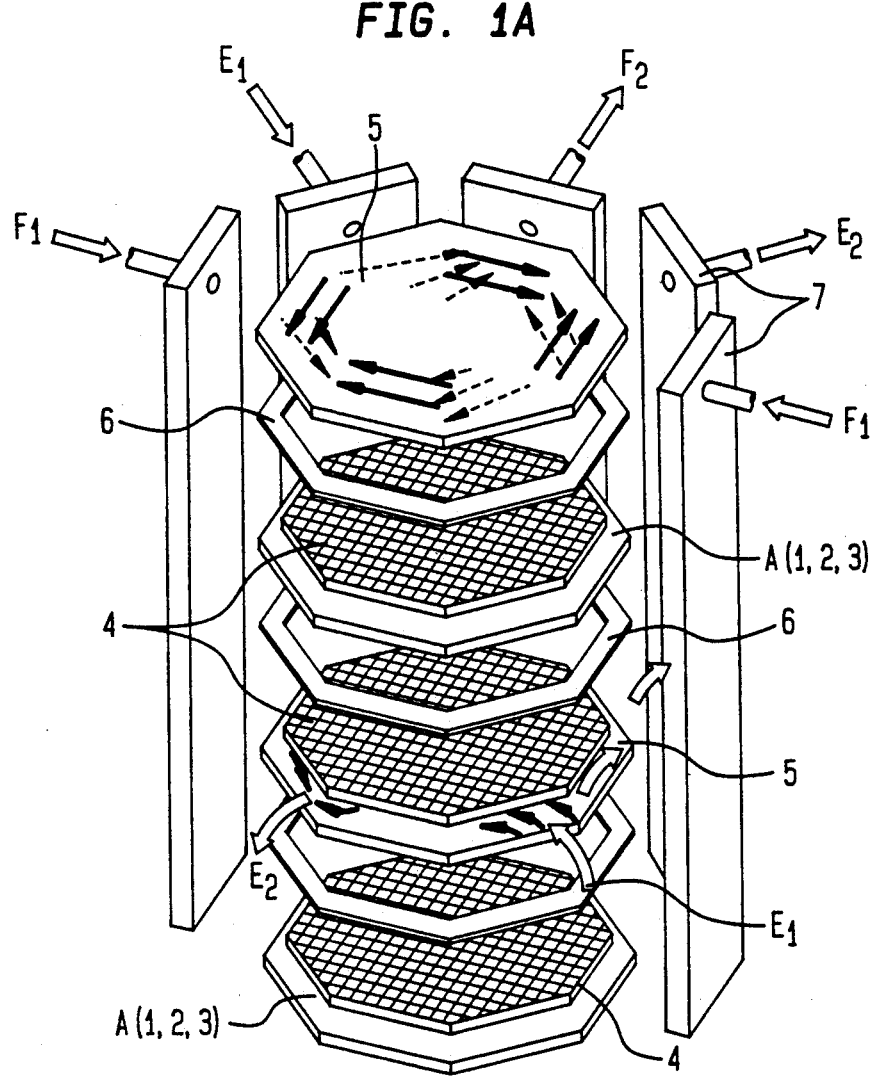
FIGS. 1A and 1B are a perspective view and a sectional view, respectively, showing a conceptual structure of a solid electrolyte fuel cell according to the present invention.
Figure 1B:
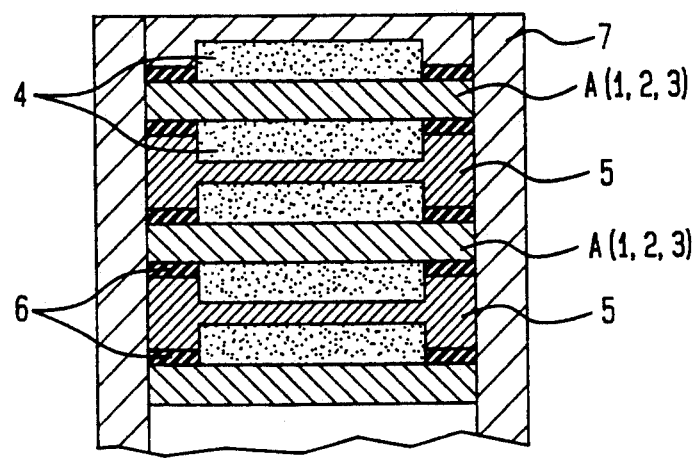
Figure 2A:
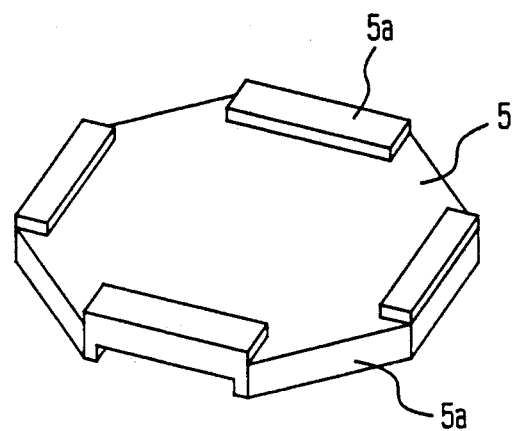
FIGS. 2A and 2B are perspective views showing a metal bipolar plate with ribs used for a first example of the invention and that with ribs and grooves used for a second example of the invention, respectively.

FIGS. 1A and 1B show an example of a fuel cell according to the present invention, which is a polygon having 4(n+1) sides. A unit cell A is composed of an anode 1 (fuel electrode), a cathode 3 (air electrode), and a solid electrolyte 2 sandwiched between the anode 1 and the cathode 3. Collectors 4 are disposed on the outer surfaces of the anode 1 and the cathode 3 of the unit cell A, respectively. A gas seal 6 mainly made of glass is disposed along the edge of the collector 4 to cover the peripheral area of the unit cell A. Each outer surface of the collector 4 and the gas seal 6 is covered with a metal bipolar plate 5. The metal bipolar plate 5 is provided with ribs 5a which extrude upward and downward alternately on the edges of the sides thereof, as shown in FIG. 2A. In this way, the unit cells A of the above structure are stacked with the collectors 4, the gas seals 6 and the metal bipolar plate 5 interposed between two adjacent unit cells A to form a multilayer fuel cell. A manifold 7 covers the sides of the fuel cell. The unit cell A, the metal bipolar plate 5 and the manifold 7 are gastight from one another by the gas seal 6.

Figure 5A:
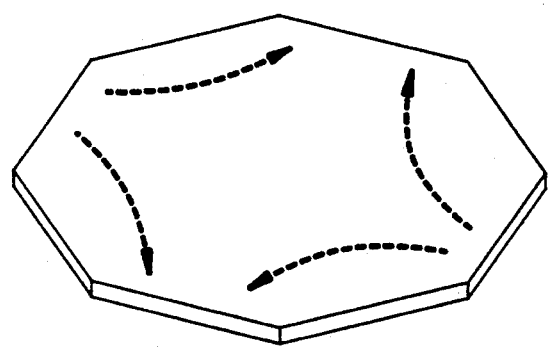
FIGS. 5A and 5B are conceptual perspective views showing the flow of a fuel gas and an oxidizing gas, respectively, in the solid electrolyte fuel cell according to the invention.
Figure 5B:
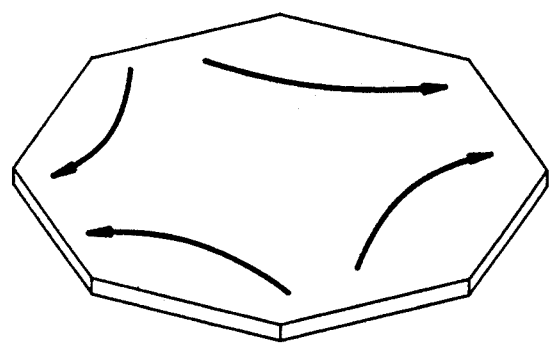
Figure 6:
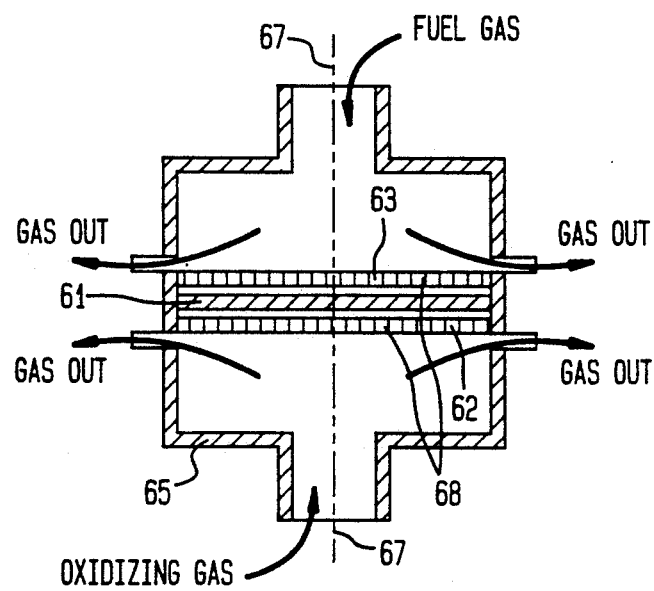
FIG. 6 is a conceptual sectional view showing the flow of a fuel gas and an oxidizing gas in a conventional flat solid electrolyte fuel cell.

In the above fuel cell, a fuel gas is supplied from fuel gas inlets F1 and discharged from fuel gas outlets F2. The fuel gas introduced in the cell flows in the direction shown in FIG. 5A. On the other hand, an oxidizing gas is supplied from oxidizing gas inlets E1 and discharged from oxidizing gas outlets E2. The oxidizing gas introduced in the cell flows in the direction shown in FIG. 5B. In this way, the fuel gas and the oxidizing gas are respectively supplied from the opposite sides and discharged to the opposite sides, and the fuel gas and the oxidizing gas flow in the directions crossing each other with the solid electrolyte 2 interposed therebetween.

In the following examples, a mixed gas of hydrogen and steam in the ratio of 99:1 was used for the fuel gas, and air for the oxidizing gas. Each gas was supplied at a rate of 1000 cc/min.

EXAMPLE 1

In this example, a fuel cell formed of five layers of the flat unit cells A was fabricated.

A regular octagonal plate made of a mixed conductive substance expressed by the formula $BaCe_{0.8}Gd_{0.2}O_{3-\alpha}$ was used for the solid electrolyte 2. An Ni cermet and $Ba_{0.4}La_{0.6}MnO_3$ were used for the anode 1 and the cathode 3, respectively, and deposited on the opposite surfaces of the solid electrolyte 2 by evaporation, thus forming the unit cell A. A SUS mesh was used for each collector 4 and glass was used for the sealing between the collector 4 and the metal bipolar plate 5.

The fuel cell proper was insulated so as to keep the temperature thereof at 850° C. and thus to generate electricity. The cell was first heated up to 1000° C. by a planar heater so as to melt the glass seal, and the temperature was then reduced to the operating temperature.

Figure 3:
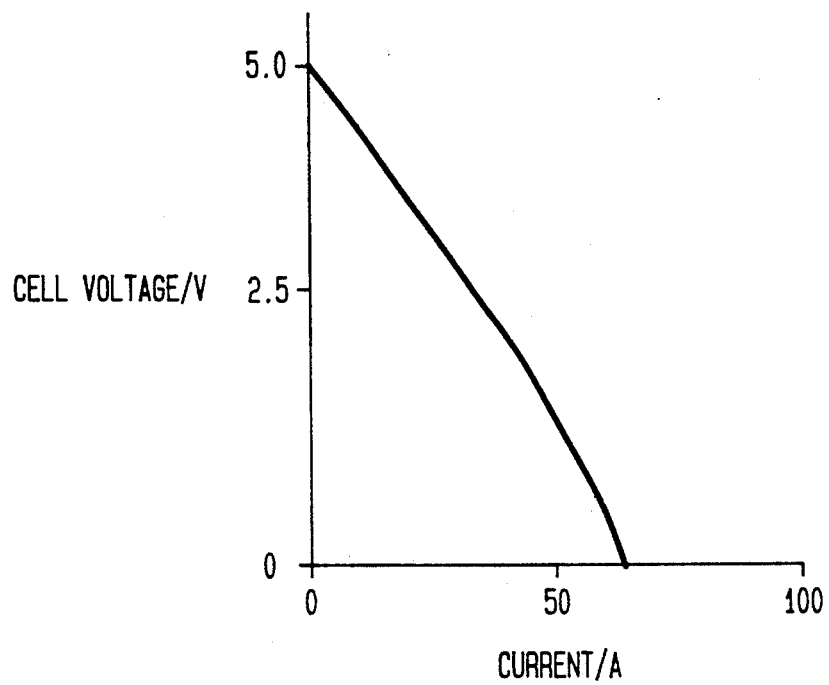
FIG. 3 is a graph showing an I-V characteristic of the solid electrolyte fuel cell of the first example.

FIG. 3 is an I-V characteristic diagram of this example. As is shown in this figure, the voltage was 1.5 V when the current was 50 A. The maximum output of this example was 82 W and the output per unit area was 0.164 W/cm². The output obtained when a unit cell was used at 850° C. was 0.18 W/cm². It was proved, therefore, that the fuel cell of this example showed nearly the same performance as the unit cell, indicating that the vertically stacked fuel cell employing the metal bipolar plate 5 operates in an effective and stable manner. It was also proved that since the components of this example were made of metal, except for the solid electrolyte 2 and the gas seal 6, the operation reliability had been greatly improved, compared with the conventional stacked structure of unit cells made of oxides.

Further, it was found that the bipolar plate 5 provided with ribs 5a as shown in FIG. 2A served to maintain high gastightness, thereby achieving an effective gas flow. Thus, the performance of the fuel cell can be improved by disposing ribs 5a on the bipolar plate 5.

Further, in this example, since the fuel gas and the oxidizing gas flowed in the directions crossing each other with the solid electrolyte 2 interposed therebetween, a satisfactory gas distribution was obtained.

EXAMPLE 2

The fuel cell of Example 1 was disassembled to check the fuel cell located on the bottom thereof which had shown low output during the testing. As a result, it was found that the SUS mesh of the bottom collector 4 had extruded into the adjacent electrode, thereby causing local gas stay and thus preventing sufficient gas diffusion. The solid electrolyte plate of the bottom unit cell had been cracked by the extrusions of the mesh.

Figure 2B:
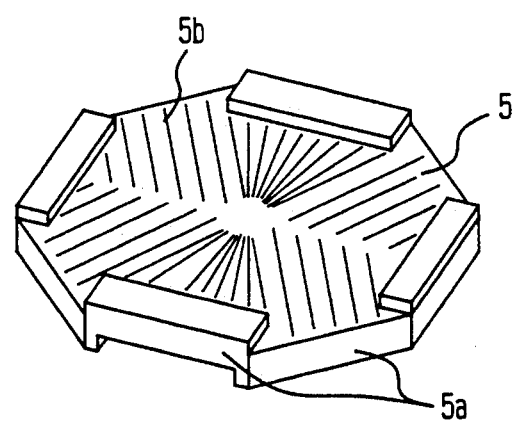

To overcome this trouble, a foam Ni plate of a thickness of 1 mm (a pore diameter of 0.2 to 0.3 mm) was used for the collector 4 for this example. Further, grooves 5b were formed on the surface of the metal bipolar plate 5 as shown in FIG. 2B so that the gas could be smoothly diffused to every corner of the electrode. The same material, shape and manufacturing method as in Example 1 were used for this example except for the collector 4 and the metal bipolar plate 5 as described above.

Figure 4:
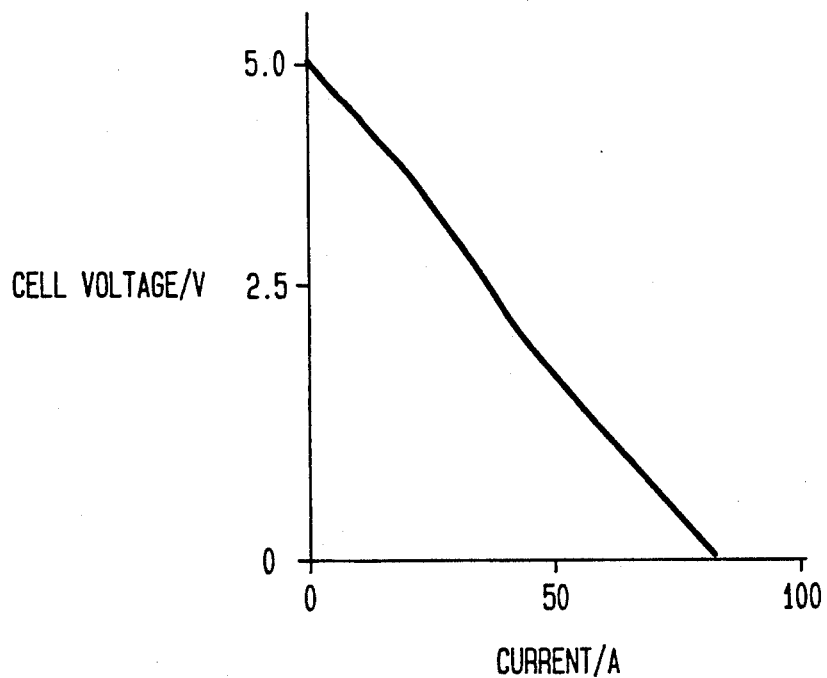
FIG. 4 is a graph showing an I-V characteristic of the solid electrolyte fuel cell of the second example.

As in Example 1, the gases were supplied to generate electricity. FIG. 4 is an I-V characteristic diagram of this example. As shown in this figure, the performance was further improved. The voltage was 1.8 V when the current was 50 A. The maximum output of this example was 88 W and the output per unit area was 0.176 $W/cm^2$. This proved that the performance of the fuel cell of this example was nearly the same as that of a unit cell, that is, 0.18 $W/cm^2$, indicating that the vertically stacked fuel cell employing the metal bipolar plate 5 provided with the ribs 5a and the grooves 5b operated in an effective and stable manner. Further, as in Example 1, it was proved that since the components of this example were made of metal except for the solid electrolyte 2 and the gas seal 6, the operation reliability had been greatly improved, compared with the conventional stacked structure of unit cells made of oxides.

In the above examples, five unit cells were vertically stacked, but the number of unit cells is not restricted. The area of the electrodes is not also restricted. Any material can be used for the solid electrolyte and the electrodes. In the above examples, the metal bipolar plate 5 provided with the ribs 5a and the grooves 5b (for Example 2) was shown, but the shape and the material of the plate and the design of the grooves are not restrictive to these examples. Also, the metal bipolar plate 5 was octagonal in the above examples, but it can be a polygon having twelve or sixteen sides.

The thickness and the bore diameter of the foam Ni plate used for the collector 4 in Example 2 are not limited to 1 mm and 0.2 to 0.3 mm, respectively, as described in the example. Also, any material, desirably Ni or an alloy including Ni, can be used for the collector 4.

The outer type manifold 7 was used for the above examples to supply the fuel gas and the oxidizing gas so that the gases flow in the directions crossing each other with the solid electrolyte interposed therebetween. However, an inner type manifold can be used as far as these gases are supplied in the same manner as described above. Any sealing and stacking agents can be used.

The unit cell was manufactured by depositing the anode and the cathode to the solid electrolyte by evaporation, but other methods for manufacturing the unit cell can be used.

In the above examples, the temperature of the fuel cell was initially raised to 1000° C. and then lowered to 850° C. for operation. However, other methods and other operating temperatures than the above can be applied as far as the temperature is within the range durable for the bipolar plate 5.

Both of the fuel gas and the oxidizing gas were supplied from the opposing sides, but either one of the gases can be supplied from the opposing sides. It is also possible to arrange it so that the gases flow in the directions crossing each other only when they are discharged.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid electrolyte fuel cell comprising:
   a plurality of flat unit cells stacked with metal bipolar plates as gas barriers interposed between the adjacent unit cells;
   a pair of inlets for introducing an oxidizing gas, the inlets being disposed in a direction opposite to each other;
   another pair of inlets for introducing a fuel gas, the inlets being disposed in a direction opposite to each other;
   a pair of outlets for discharging the fuel gas, the outlets being disposed in a direction opposite to each other; and
   another pair of outlets for discharging the oxidizing gas, the outlets being disposed in a direction opposite to each other;
   wherein each unit cell includes a first electrode, a second electrode, and a solid electrolyte disposed between the first electrode and the second electrode, the first electrode being supplied with a fuel gas and the second electrode being supplied with an oxidizing gas so as to generate electricity;
   wherein the fuel gas and the oxidizing gas flow with the solid electrolyte interposing therebetween;
   wherein the metal bipolar plate is a polygon having $4(n+1)$ sides, wherein n denotes a natural number starting from 1;
   wherein the fuel gas is introduced through the pair of inlets for introducing the fuel gas and discharged through the pair of outlets for discharging the fuel gas, and the directions in which the fuel gas is introduced are perpendicular to the directions in which the fuel gas is discharged;
   wherein the oxidizing gas is introduced through the pair of inlets for introducing the oxidizing gas and discharged through the pair of outlets for discharging the oxidizing gas, and the directions in which the oxidizing gas is introduced are perpendicular to the directions in which the oxidizing gas is discharged; and
   wherein the directions in which the oxidizing gas is introduced and discharged are different from the directions in which the fuel gas is introduced and discharged.

2. A solid electrolyte fuel cell according to claim 1, wherein the polygon is a regular polygon.

3. A solid electrolyte fuel cell according to claim 1, wherein the polygon is an octagon.

4. A solid electrolyte fuel cell according to claim 1, wherein the metal bipolar plate has ribs so as to facilitate uniform diffusion of the fuel gas and the oxidizing gas on the surfaces of the plate.

5. A solid electrolyte fuel cell according to claim 1, wherein the metal bipolar plate is provided with grooves on the surface thereof.

6. A solid electrolyte fuel cell comprising:

a plurality of flat unit cells stacked with collectors interposed between the adjacent unit cells;

wherein each cell includes a first electrode, a second electrode, and a solid electrolyte disposed between the first electrode and the second electrode, the first electrode being supplied with a fuel gas and the second electrode being supplied with an oxidizing gas so as to generate electricity; and wherein the collectors are made of foam metal or a foam alloy.

7. A solid electrolyte fuel cell according to claim 6, wherein the collectors are made of foam metal or a foam alloy containing nickel.

* * * * *